(12) United States Patent
Ijuin

(10) Patent No.: US 10,860,264 B2
(45) Date of Patent: *Dec. 8, 2020

(54) NON-TRANSITORY COMPUTER-READABLE MEDIUM STORING INSTRUCTIONS REALIZING GRAPHICAL OBJECT PROCESSOR, AND METHOD OF CONTROLLING INFORMATION PROCESSING DEVICE

(71) Applicant: Brother Kogyo Kabushiki Kaisha, Nagoya (JP)

(72) Inventor: Keisuke Ijuin, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/556,359

(22) Filed: Aug. 30, 2019

(65) Prior Publication Data

US 2019/0384541 A1 Dec. 19, 2019

Related U.S. Application Data

(63) Continuation of application No. 16/022,991, filed on Jun. 29, 2018, now Pat. No. 10,445,027.

(30) Foreign Application Priority Data

Sep. 29, 2017 (JP) ................. 2017-190403

(51) Int. Cl.
*G06F 3/12* (2006.01)
*G06T 3/00* (2006.01)
(Continued)

(52) U.S. Cl.
CPC ........... *G06F 3/1206* (2013.01); *G06F 3/122* (2013.01); *G06F 3/1208* (2013.01);
(Continued)

(58) Field of Classification Search
None
See application file for complete search history.

(56) References Cited

U.S. PATENT DOCUMENTS 5,835,693 A * 11/1998 Lynch .................... G06T 13/20
345/473
9,501,257 B1 * 11/2016 Bag ....................... G06F 3/1205
(Continued)

FOREIGN PATENT DOCUMENTS

JP 2015-225481 A 12/2015

*Primary Examiner* — Miya J Williams
(74) *Attorney, Agent, or Firm* — Banner & Witcoff, Ltd.

(57) ABSTRACT

A graphical object processor has a single filter. The filter includes a program for constructing a pipeline consisted of a plurality of stages based on a print ticket. In one or more of the plurality of stages, a content box of print-target data is modified. When the content box is modified, commands respectively indicating affine transformation matrices are generated. The commands are pushed into a command stack. The pushed commands are used for modification of a visual element. Specifically, the affine transformation matrices are multiplied and thereby an integrated transformation matrix is generated. The visual element is modified by multiplying an affine transformation matrix of the visual element by the integrated transformation matrix.

12 Claims, 15 Drawing Sheets

(51) Int. Cl.
*H04N 1/393* (2006.01)
*G06K 15/02* (2006.01)

(52) U.S. Cl.
CPC .......... *G06F 3/1214* (2013.01); *G06F 3/1228* (2013.01); *G06F 3/1246* (2013.01); *G06F 3/1247* (2013.01); *G06F 3/1248* (2013.01); *G06F 3/1254* (2013.01); *G06F 3/1277* (2013.01); *G06F 3/1285* (2013.01); *G06T 3/0006* (2013.01); *G06F 3/1212* (2013.01); *G06K 15/1813* (2013.01); *G06K 15/1849* (2013.01); *G06K 15/1874* (2013.01); *H04N 1/393* (2013.01)

(56) References Cited

U.S. PATENT DOCUMENTS

| | | | |
|---|---|---|---|
| 10,445,027 B2 * | 10/2019 | Ijuin | G06T 3/0006 |
| 2005/0206940 A1 | 9/2005 | Lin | |
| 2010/0156938 A1 * | 6/2010 | Conlon | G06T 3/0006 |
| | | | 345/649 |
| 2012/0300248 A1 * | 11/2012 | Robertson | G06F 3/1204 |
| | | | 358/1.15 |
| 2015/0153996 A1 * | 6/2015 | Miki | G06F 3/1462 |
| | | | 345/634 |
| 2015/0178603 A1 * | 6/2015 | Marr | G06K 15/1849 |
| | | | 358/1.13 |
| 2018/0217788 A1 * | 8/2018 | Nakagawa | G06F 3/1247 |
| 2018/0324323 A1 | 11/2018 | Kawara | |

* cited by examiner

Nup: 2in1
First page
Watermark: Text, Information necessary for the watermark
Orientation: Portrait
Second page
Watermark: None
Orientation: Landscape PageWidth, PageHeight
(210, 297)
ContentBox
(5, 5, 200, 287)

PageWidth, PageHeight
(297, 210)
ContentBox
(5, 5, 287, 200)

|  | First stage Command | Second stage Command | | Third stage Command | Fourth stage Command | | |
| --- | --- | --- | --- | --- | --- | --- | --- |
| Command stack of first page | v1 | – | | – | m3 | m4 | p2 |
| Command stack of second page | – | m1 | m2 | – | m5 | m6 | |

FIG. 10A

| Command stack of first page | v1 | m3 | m4 | p2 |
| --- | --- | --- | --- | --- |
| Command stack of second page | m1 | m2 | m5 | m6 |

FIG. 10B

| Command stack of first page | v1 | m3 | m4 | p2 |
| --- | --- | --- | --- | --- |
| Command stack of second page | m1 | m2 | m5 | m6 |

FIG. 10C

```
Resolve p2: m6→m5→m2→m1
A2=ExM6xM5xM2xM1
p2': A2x(Affine transformation matrix of each of visual element of
    second page)
```

FIG. 10D

| Command stack of first page | v1 | m3 | m4 | – |
| --- | --- | --- | --- | --- |
| Visual element stack of first page | p2' | | | |
| Command stack of second page | – | – | – | – |

FIG. 10E

| Command stack of first page | v1 | m3 | m4 |
| --- | --- | --- | --- |
| Visual element stack of first page | p2' | | |

FIG. 10F

```
Resolve m4, m3: m4→m3
A1=ExM4xM3
```

FIG. 10G

| Command stack of first page | v1 |
|---|---|
| Visual element stack of first page | p2' |

FIG. 10H

```
v1': A1x(Affine transformation matrix of
     visual element indicated by v1)
```

FIG. 10I

| The visual element stack of the first page | p2' | v1' |
|---|---|---|

FIG. 10J

NON-TRANSITORY COMPUTER-READABLE MEDIUM STORING INSTRUCTIONS REALIZING GRAPHICAL OBJECT PROCESSOR, AND METHOD OF CONTROLLING INFORMATION PROCESSING DEVICE

CROSS-REFERENCE TO RELATED APPLICATIONS

This application is a continuation of prior U.S. application Ser. No. 16/022,991, filed Jun. 29, 2018, which claims priority under 35 U.S.C. § 119 from Japanese Patent Application No. 2017-190403 filed on Sep. 29, 2017. The entire subject matter of the prior applications are incorporated herein by reference.

BACKGROUND

Technical Field

The present disclosures relate to a non-transitory computer-readable medium storing instructions realizing a printer driver.

Related Art

It is known that Microsoft Corporation® adopts an architecture called as an XPS printer driver "XPSDrv." The XPSDrv generally includes a pipeline having a plurality of filters respectively having different functions. For example, the plurality of functions include a function of magnifying/reducing an image represented by print-target data and a function of rotating an image represented by the print-target data and the like.

Such filters for the pipeline of the XPSDrv may be developed by a vendor of a printer.

SUMMARY

XPS data, which is created by the XPSDrv, includes object data indicating graphical objects such as characters, figures, images, and transformation instruction data instructing transformation to be applied to the object data. The filters apply transformation processes including a rotation process, a magnification/reduction process and a translation process to the object data based on the transformation instruction data. The XPS data indicating a single page includes a plurality of pieces of object data, and the plurality of pieces of object data respectively indicate a plurality of objects configuring the page. The object data includes a matrix. The transformation process is a process of multiplying a matrix included in a graphical object by a matrix corresponding to the transformation process. Accordingly, when a plurality of transformation processes are applied to a single page of the XPS data, N (the number of the objects)×M (the number of the transformation processes) times of matrix operations should be performed. Therefore a relatively long time period is required from start of the transformation processes until generation of print data.

In consideration of the above, aspects of the present disclosures provide an improved technique of reducing a period of time necessary for creating print data.

According to aspects of the present disclosure, there is provided a non-transitory computer-readable medium storing computer-readable instructions realizing a printer driver. The printer driver causes, when executed, the controller to perform a receiving process of receiving print-target data including first object data indicating a graphical object and modification instruction data instructing to perform a plurality of modifications of the graphical object, and a generating process of generating a plurality of first commands corresponding to the plurality of modifications, respectively. The first object data includes a matrix indicating at least one of a position and a size of the graphical object. The plurality of first commands indicate transformation matrices, respectively, each of the transformation matrices transforming the matrix of the first object data based on one of the plurality of modifications. The printer driver further causes, when executed, the controller to perform an integrating process to generate an integrated transformation matrix by multiplying the plurality of transformation matrices, and a modifying process to modify the first object data by multiplying the matrix of the first object data by the integrated transformation matrix.

According to aspects of the present disclosure, there is provided an information processing device. The information processing device includes a controller configured to receive print-target data including first object data indicating a graphical object and modification instruction data instructing to perform a plurality of modifications of the graphical object, and generate a plurality of first commands corresponding to the plurality of modifications, respectively. The first object data includes a matrix indicating at least one of a position and a size of the graphical object. The plurality of first commands indicate transformation matrices, respectively, each of the transformation matrices transforming the matrix of the first object data based on one of the plurality of modifications. The controller is further configured to generate an integrated transformation matrix by multiplying the plurality of transformation matrices, and modify the first object data by multiplying the matrix of the first object data by the integrated transformation matrix.

According to aspects of the present disclosure, there is provided a method implementable on a processor coupled with an information processing device. The method includes receiving print-target data including first object data indicating a graphical object and modification instruction data instructing to perform a plurality of modifications of the graphical object, and generating a plurality of first commands corresponding to the plurality of modifications, respectively. The first object data includes a matrix indicating at least one of a position and a size of the graphical object. The plurality of first commands indicate transformation matrices, respectively, each of the transformation matrices transforming the matrix of the first object data based on one of the plurality of modifications. The method further includes generating an integrated transformation matrix by multiplying the plurality of transformation matrices, and modifying the first object data by multiplying the matrix of the first object data by the integrated transformation matrix.

According to aspects of the present disclosures, since the integrated transformation matrix is generated by the multiplication, and the matrix included in the first object data is multiplied by the generated integrated transformation matrix, the number of operations by a CPU of the information processing device can be reduced as compared with a case where the first object data is modified by each of the transformation matrices. Thus, it is possible to shorten generation time of the print data.

BRIEF DESCRIPTION OF THE ACCOMPANYING DRAWINGS

FIGS. 10A and 10B show an example of commands which are pushed into a command stack.

FIGS. 10C-10J show a procedure of resolving the commands.

DETAILED DESCRIPTION

Hereinafter, an illustrative embodiment according to the present disclosures will be described with reference to the accompanying drawings. It is noted that the illustrative embodiment described below is only an example of the present disclosures, and can be modified in various ways without departing from aspects of the present disclosures. For example, an order of processes described later may be arbitrarily changed without departing from the aspects of the present disclosures.

Illustrative Embodiment

Figure 1:
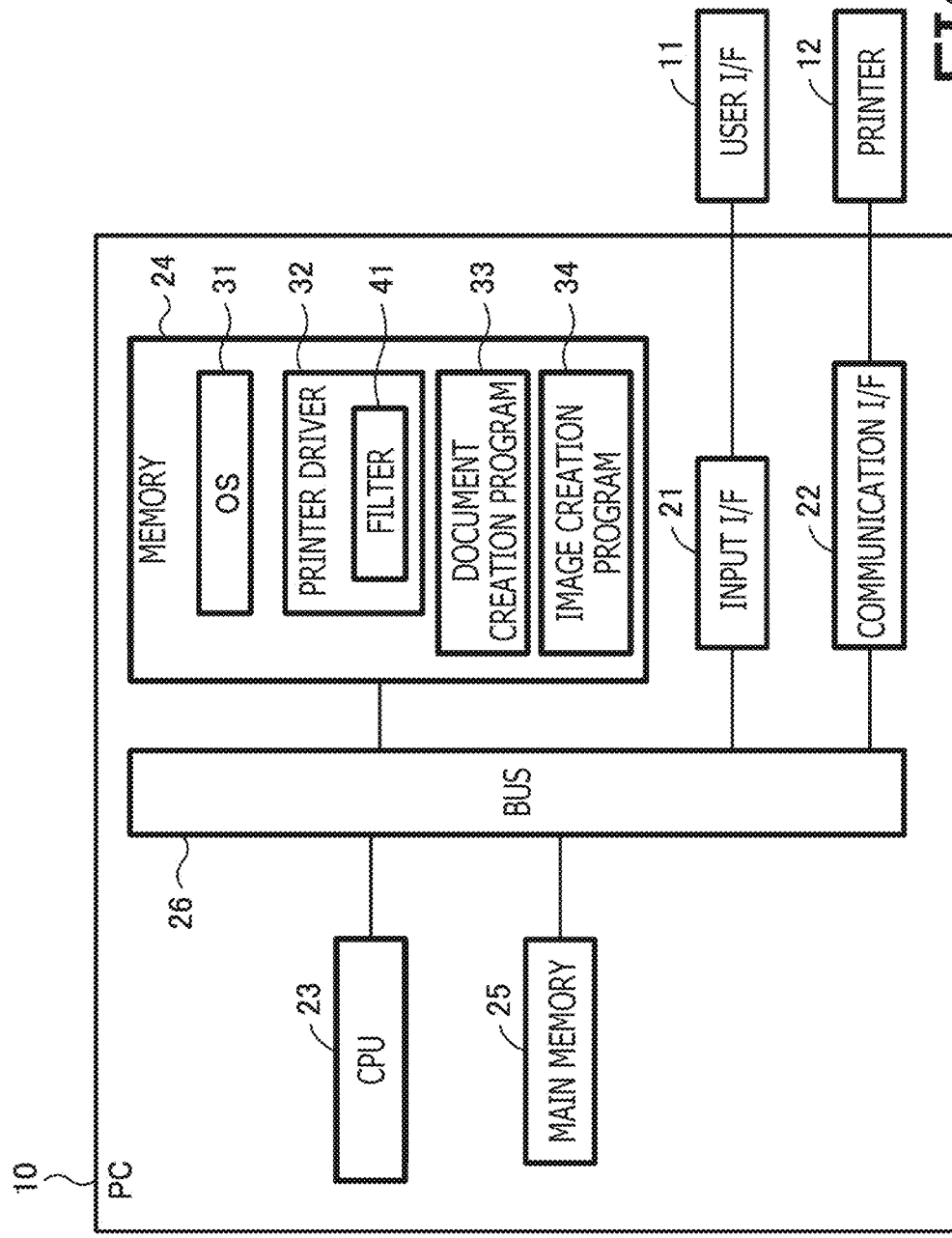
FIG. 1 is a block diagram showing a functional configuration of a PC according to an illustrative embodiment.

FIG. 1 schematically shows a configuration of a PC 10 in which a printer driver 32 according to the illustrative embodiment is installed. The PC 10 is, for example, a personal computer. In the following description, only configurations necessary for performing a printing process will be explained. The PC 10 is an example of an information processing device.

The PC 10 is provided with an input I/F 21, a communication I/F 22, a CPU 23, a memory 24, a main memory 25 and a bus 26.

The input I/F 21 is connected to the user I/F 11 by wired or wireless connection. The user I/F 11 may include a keyboard and a mouse. The user I/F 11 is configured to receive a user input such as a printing instruction, a user input of print settings, and the like. The user input received by the user I/F 11 is transmitted to the PC 10 through the input I/F 21.

The communication I/F 22 is connected to a printer 12 by wired connection using an USB cable or a LAN cable, or by wireless connection through a wireless LAN, and performs data communication with the printer 12. For example, print data is transmitted from the PC 10 to the printer 12 through the communication I/F 22. For another example, information indicating occurrence of a paper jam is transmitted from the printer 12 to the PC 10 through the communication I/F 22.

The CPU 23 is configured to perform computing operations. The memory 24 is configured to store programs as will be described later. The main memory 25 is used when the CPU 23 executes respective programs stored in the memory 24. The memory 24 is, for example, a hard disk in which a large amount of data can be stored. The main memory 25 is, for example, a RAM such as a DRAM in which a high-speed access of data is available.

The CPU 23 is configured to execute respective programs stored in the memory 24. Specifically, a program stored in the memory 24 and to be executed is developed in the main memory 25, and the CPU 23 sequentially executes commands described in respective addresses of the program. The CPU 23 is an example of a controller.

The memory 24 stores an OS 31, the printer driver 32, a document creation program 33 and an image creation program 34.

Each of the memory 24 and the main memory 25 may be a computer-readable storage medium. The computer-readable storage medium is a non-transitory medium. The non-transitory medium includes, in addition to the computer-readable storage medium above, a storage medium such as a CD-ROM, a DVD-ROM and the like. It is also noted that the non-transitory medium is a tangible medium. In contrast, an electrical signal carrying programs downloaded from a server on the Internet or the like is a computer-readable signal medium, which is one type of the computer-readable storage medium, is not included in the non-transitory computer-readable storage medium.

The document creation program 33 is a program used to create a document. The image creation program 34 is a program used to process an image such as a photograph. In the following description, the document creation program 33 or the image creation program 34 will occasionally be referred to as an "editing program" for the sake of description. In response to a user of the PC 10 instructing, through the user I/F 11, printing of a created document or a created image, the editing program outputs image data representing the created document or the created image, which is instructed to be printed, as print-target data. The print-target data has a particular format which can be interpreted/processed by the OS 31. Further, selected printer information indicating a printer selected by the user through the user I/F 11, and print settings which have been input through the user I/F 11 are output together with the print-target data. When executed by the CPU 23, the editing program displays, on a display of the PC 10, a setting window for requesting the user to select a printer and input the print settings, receives an input through the user I/F 11, and stores the selected printer information and the print settings in the memory 24.

Further, in addition to or in place of the document creating program 33 and the image creating program 34, a spreadsheet program or another program could be an example of the editing program. The editing program may receive the print settings from the printer driver 32 corresponding to the selected printer and output the print settings together with the print-target data. The OS 31 may display the setting windows, receive the user's input through the user I/F 11, and store the selected printer information and the print settings in the memory 24. In this case, the OS 31 retrieves the selected printer information and the print settings from the memory 24 when receiving the print-target data transmitted from the editing program.

The print settings include a setting of a sheet size (e.g., A4, B5 or the like), a setting of a magnification/reduction ratio, a setting of a watermark, a setting of a printing orientation (e.g., portrait or landscape), a setting of a color (e.g., monochrome or full color), a setting of N-up and the like.

Figure 9A:
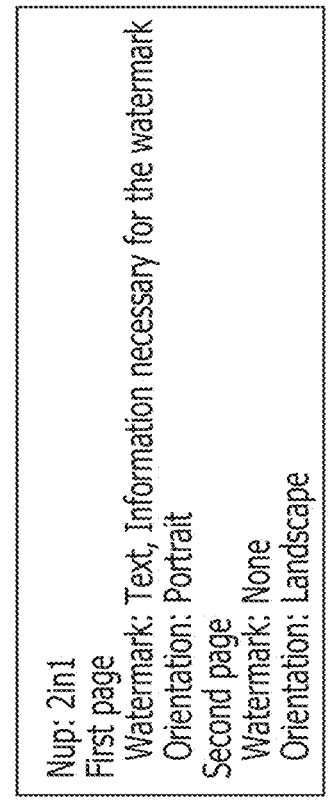
FIGS. 9A, 9B, 9C and 9D illustrate the N-up process.

A print ticket (described later) is data converted from the print settings, and is an example of modification instruction data. An example of the print ticket is shown in FIG. 9A. The print ticket shown in FIG. 9A indicates that (1) a 2 in 1 printing is set with respect to all the pages represented by the print-target data, (2) addition of a watermark is set and the printing orientation is set as portrait with respect to the first page, and (3) addition of no watermark is set and the printing orientation is set as landscape with respect to the second page. It is noted that the print ticket may indicate other settings. For example, the print ticket may indicate a print size, a setting of one-side printing/both-side printing, a setting of color printing/monochrome printing, and the like.

Basically, the print ticket includes all pieces of information necessary for generating commands in the first to fourth stages (described later). For example, in the print ticket shown in FIG. 9A, settings for the first page include, not only the information indicating addition of the watermark, but also information indicating that the watermark is formed based on text data, the text data representing a character string "Watermark" to be used as the watermark, information indicating a position and a size of the watermark. It is noted that the information indicating the position of the watermark may indicate a relative position within a content box (described later). In such a case, information indicating a position of the content box which is included in XPS data (described later) is also used to generate the commands.

The watermark is translucent character(s) or figure(s) to be overprinted on original characters and/or image(s) printed on the printing sheet. The watermark is used, for example, to indicate that copyright subsists.

The N-up is a print setting of printing a plurality of pages, for example two pages or four pages, collectively into one page. The N-up is also known as N in 1.

The OS 31 is a program controlling execution of other programs such as the printer driver 32 and the editing programs. An example of the OS 31 is Microsoft Windows®.

The OS 31 includes a DLL for converting the print-target data output by the editing programs into the print-target data having an XPS (XML Paper Specification) format. The OS 31 also includes a DLL for generating the print ticket based on the print settings which are output by the editing program. The OS 31 further includes a DLL for packaging, in accordance with an OPC (Open Packaging Conversions), the print object data having the XPS-format and the print ticket.

The XPS is a format developed by Microsoft® as a file format for a printing process, and is a subset for XAML (Extensible Application Markup Language). The XAML is a markup language based on XML. The XML format Data includes an affine transformation matrix used for an affine transformation, and images can be magnified/reduced and/or rotated without image quality thereof being deteriorated.

The XPS format print-target data is an XAML document generated by converting the print-target data output by the editing program to the XPS format data. Hereinafter, the XPS format print-target data is also referred to as the XPS data. In the XPS data, one page is indicated as a data unit called as a Fixed Page. Accordingly, the print-target data indicating a plurality of pages is converted to the XPS data including a plurality of Fixed Pages.

Figure 9B:
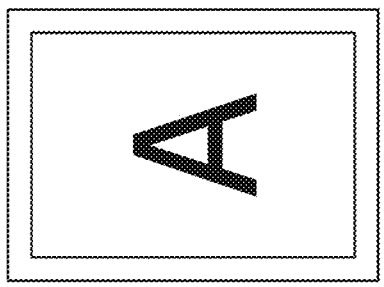
Figure 9C:
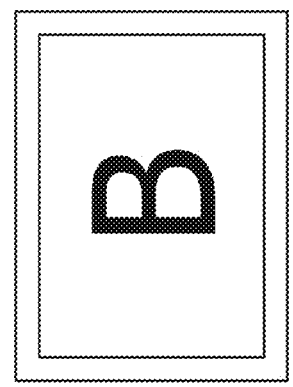
Figure 9D:
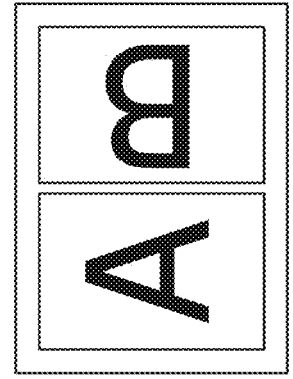

Examples of Fixed Page are shown in FIG. 9B and FIG. 9C. Each Fixed Page includes Page Width representing a width of the page, Page Height representing a height of the page, ContentBox representing a content box within the page, and a visual element. In the Fixed Page indicating the first page shown in FIG. 9B, the Page Width is 210, and the Page Height is 297. The ContentBox indicates, for example, an area in which an image is rendered, and includes data of Margin indicating a space from an edge of the page to an edge of the ContentBox, Width indicating a width of the ContentBox, and Height indicating a height of the ContentBox. In the example shown in FIG. 9B, the ContentBox of the first page is defined such that the Margin in a width direction is 5, the Margin in a height direction is 5, the Width is 200, and the Height is 287.

The visual element includes at least one of a Path element, a Glyphs element and a Canvas element. Each visual element includes an affine transformation matrix as Render Transform. The affine transformation matrix is a matrix defining a position and a size of the visual element. That is, the visual element could be image data including data defining a position and a size thereof. For example, the visual element is reduced by multiplying the affine transformation matrix included in the visual element by an affine transformation matrix defining reduction. For another example, the visual element is rotated by multiplying the affine transformation matrix included in the visual element by an affine transformation matrix defining rotation. The visual element is an example of the first object data representing the graphical object, and the affine transformation matrix is an example of the transformation matrix. FIG. 9B shows that the Fixed Page of the first page includes a visual element indicating an image of "A," and FIG. 9C shows that the Fixed Page of the second page includes a visual element indicating an image of "B." In FIG. 9B and FIG. 9C, outside squares surrounding "A" and "B" indicate areas of the pages, respectively, and inside squares surrounding "A" and "B" indicate areas of the content boxes, respectively. The area of each content box is an area within which the corresponding visual element is rendered.

The printer driver 32 is a so-called XPS printer driver "XPSDrv." The printer driver 32 is provides with a filter 41. The filter 41 is a DLL. The filter 41 modifies the input print-target data having the XPS format in accordance with the print setting to generate PDL format print data, and outputs the generated PDL format data. That is, modification of the print-target data in accordance with the print setting, and conversion of the modified print-target data into the PDL format print data performed only by the filter 41. The filter 41 is an example of the first filter.

Figure 6:
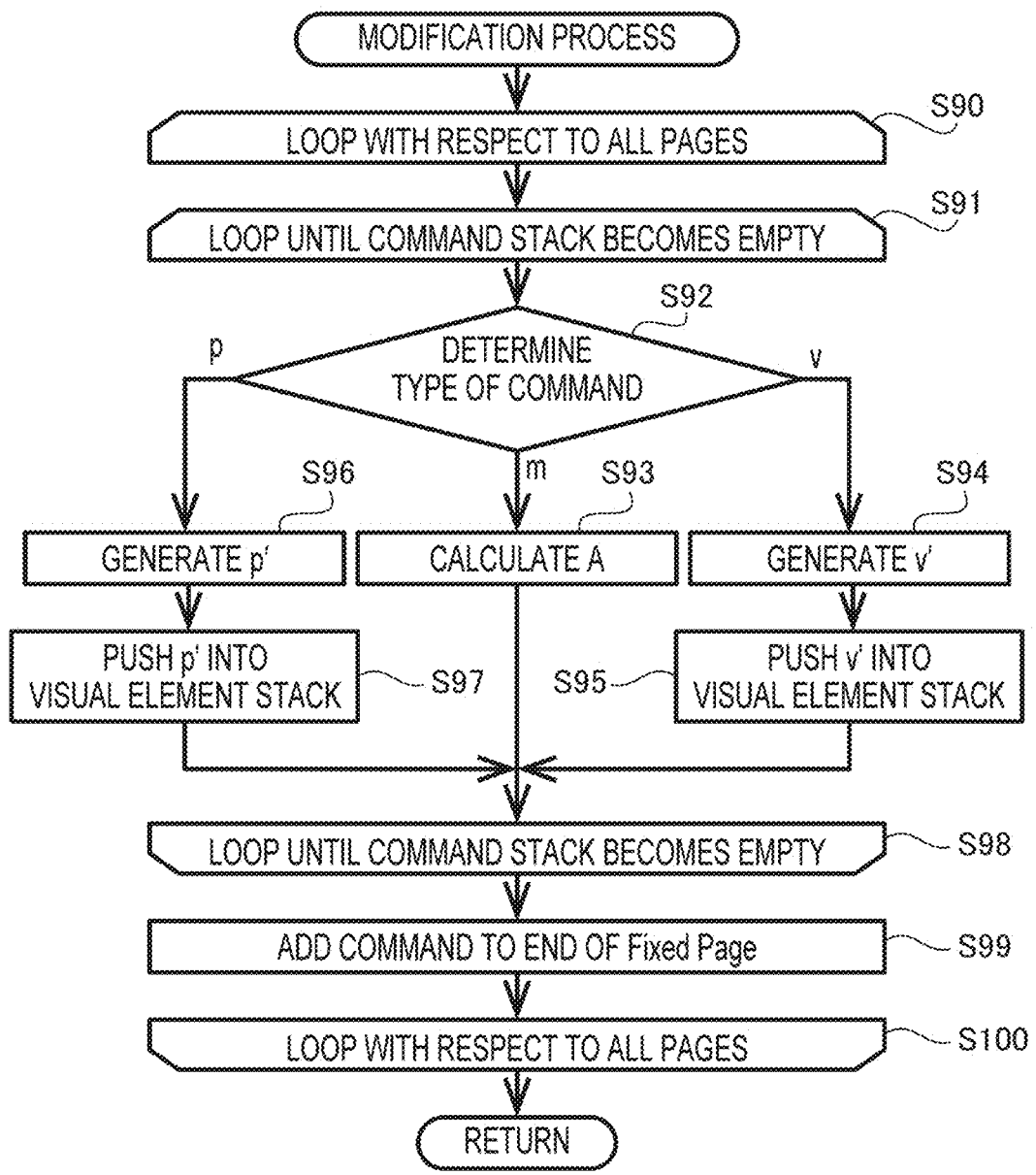
FIG. 6 is a flowchart showing the transformation process.

For executing a modification process shown in FIG. 6, the filter 41 employs data structures of a command stack and a visual element stack where a command is pushed or popped. Pushing a command into the stack corresponds to store the command in the stack, while popping a command from the stack corresponds to extract the command from the stack.

Figure 2:
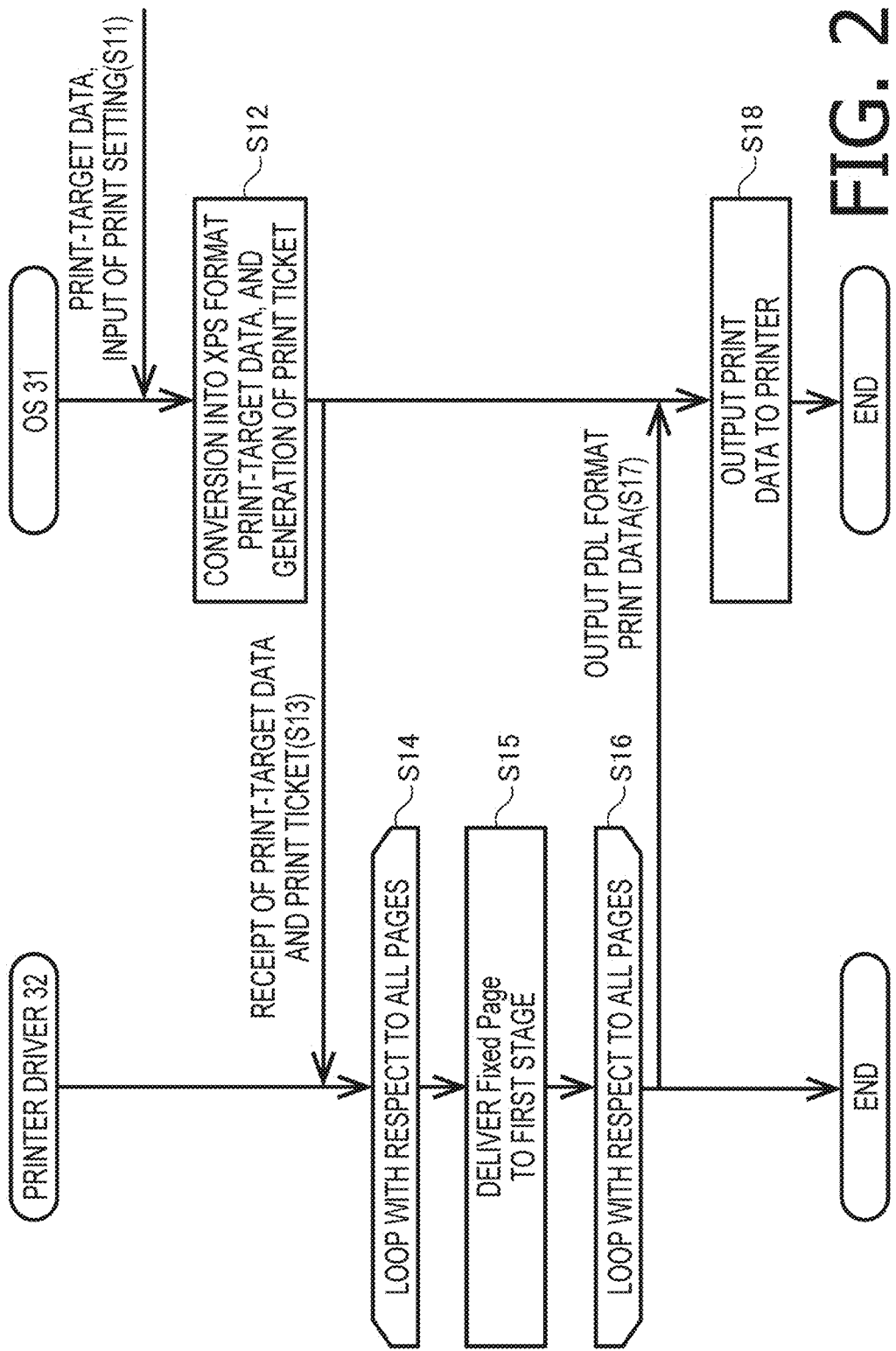
FIG. 2 is a sequence diagram illustrating a data communication performed between an OS and a printer driver.

Referring to FIG. 2, processes performed by the OS 31 and the printer driver 32 of the PC 10 are explained. In response to receipt of a document file or an image file (print-target data), which are created by the editing program, and receipt of input of print setting (S11), the OS 31 converts the print-target data into the print-target data having the XPS format using the DLL described above, and creates a print ticket from the print setting (S12).

The printer driver 32 receives, using an input function (DLL) (not shown), input of the XPS format print-target data and the print ticket, which are created by the OS 31 (S13). At this stage, the printer driver 32 receives data as a stream input. Whether the data is received as the stream input or the XPS input is determined based on the input function designated by the printer driver 32. It is noted that the printer driver 32 may receive data as the XPS input.

Since the OS 31 and the printer driver 32 are executed on the main memory 25, "input from the OS 31 to the printer driver 32" is performed as a data processing, and is different from a physically performed input such as input of the print setting from the user I/F 11 to the PC 10 or input of print data from the PC 10 to the printer driver 32. The processes of the printer driver 32 to receive the XPS-format print-target data and the print ticket are examples of the receiving process.

In the present specification, basically, processes of the CPU 23 in accordance with instructions recited in a program will be described. For example, in a following description, a process of "judge," "extract," "select," "calculate," "determine," "designate," "acquire," "receive," "control" or "set" represents a process of the CPU 23. The process of the CPU 23 includes control of a hardware via the OS 31. Further, the term "acquire" will be used as a concept without requirement. Therefore, the process of the CPU 23 to receive data without requirement is included in a concept that "the CPU 23 acquires data." Additionally, "data" in the description is represented by a computer-readable bit string. A plurality of pieces of data, of which meanings are substantially the same, but formats are different from each other, are treated as identical data. The term "information" in the description is also treated in a similar manner to "data." Further, the processes such as "instruction," "response" and "requirement" are performed by communicating information indicating "instruction," "response" and "requirement," respectively. The terms "instruction," "response" and "requirement" may be described in the sense of information itself indicating "instruction," "response" and "requirement," respectively.

The printer driver 32 modifies the input XPS-format print-target data based on the print settings, and converts the modified print-target data into the PDL format print data (see S14-S16, and processes shown in FIG. 3A-FIG. 6).

After generating the PDL format print data, the printer driver 32 outputs the PDL format print data to the OS 31 using a not-shown output function (DLL) in S17. At this stage, the printer driver 32 outputs the print data as the XPS output. Whether the print data is output as a stream output or the XPS output is determined based on the output function designated by the printer driver 32. It is noted that the printer driver 32 may output data as the stream output.

The OS 31 transmits, to the printer 12 via the communication I/F 22, the PDL format print data output by the printer driver 32 as it is (S18), or after converting the PDL format into another format (S18).

Hereinafter, the processes of S14-S16 performed by the printer driver 32 will be described in detail, referring to FIGS. 3A, 3B, 3C, FIGS. 4A, 4B, and FIG. 5-FIG. 9, FIGS. 10A-10J.

The printer driver 32 receives inputs of the XPS format print-target data and the print ticket. The printer driver 32 configures a pipeline with a first stage (FIG. 3A), a second stage (FIG. 3B), a third stage (FIG. 3C), a fourth stage (FIGS. 4A and 4B) and a last stage (FIG. 5). Specifically, the printer driver 32 has a stage manager (not shown), which is programmed to apply a pipeline process to the XPS data by executing the first-fourth stages in this order, and, after the first-fourth stages of the pipeline process have been applied to entire XPS data, apply the last stage of the pipeline process to the XPS data. Concretely, the stage manager is configured to receive the XPS format print-target data and input of the print ticket.

Before starting the pipeline process, the stage manager associates each Fixed Page included in the XPS data with the command stack and the visual stack. The stage manager delivers the Fixed Page associated with the stacks to an initial stage of the pipeline (S15). According to the illustrative embodiment, the initial stage is the first stage. It is noted that "to associate the Fixed Page with a stack" may include a concept of adding a stack to the Fixed Page.

The process of S15 is executed on the Fixed Page of a top page. After the pipeline process of Fixed Page of one page has been completed, the stage manager delivers the Fixed Page of the next page to the initial stage of the pipeline (S15). The processes are repeatedly performed (looped) with respect to all the Fixed Pages (S14, S16). As will be described in detail later, the print-target data sends to the initial stage of the pipeline is processed in each stage of the pipeline.

Figure 3A:
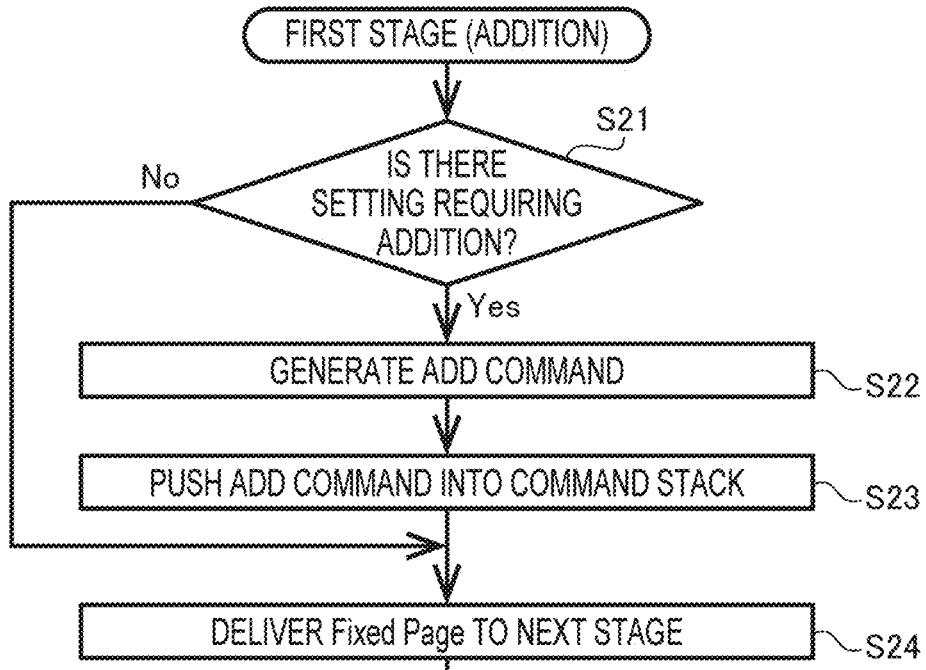
FIGS. 3A, 3B and 3C are flowcharts respectively showing first, second and third stages of a pipeline according to the illustrative embodiment.

The first stage shown in FIG. 3A is a stage of adding a visual element to the print-target data. In the first stage, the filter 41 determines whether a setting requiring addition of a visual element is included in the print ticket (S21). The visual element is, for example, the watermark. When it is determined that a setting which requires addition of the visual element is included (S21: YES), the filter 41 generates an add command to add the visual element to the Fixed Page in accordance with information included in the print ticket (S22), and pushes the generated add command into the command stack associated with the Fixed Page (S23). The add command is an example of a second command.

In the example shown in FIG. 9C, information indicating that the watermark is formed on the first page is included in the print ticket. Therefore, when receiving the Fixed Page of the first page from the stage manager (S21: YES), the filter 41 generates the add command to add the watermark to the Fixed Page (S22). That is, the filter 41 generates, in accordance with the information included in the print ticket, image data (an example of the visual element) based on the text "Watermark." Then, the filter 41 generates the add command including the generated image data and information indicating a position and a size of the watermark. Concretely, information indicating the position and the size of the watermark may be included in the image data. The filter 41 pushes the generated add command into the command stack of the first page (S23).

Next, the filter 41 delivers the Fixed Page to the stage manager (S24). The stage manager delivers the received Fixed Page to the next stage in accordance with the pipeline.

On the other hand, when the filter 41 determines that the setting which requires addition of the visual element is not included (S21: NO) (e.g., the second page is to be processed in FIG. 9A), the process proceeds to S24.

The second stage to the fourth stage are stages for modifying the ContentBox. The ContentBox is modified in accordance with the print setting from the second stage to the fourth stage, and commands corresponding to the applied modifications are generated. By the modifying process in the last stage, the visual element is modified in accordance with the generated command (S81).

Figure 3B:
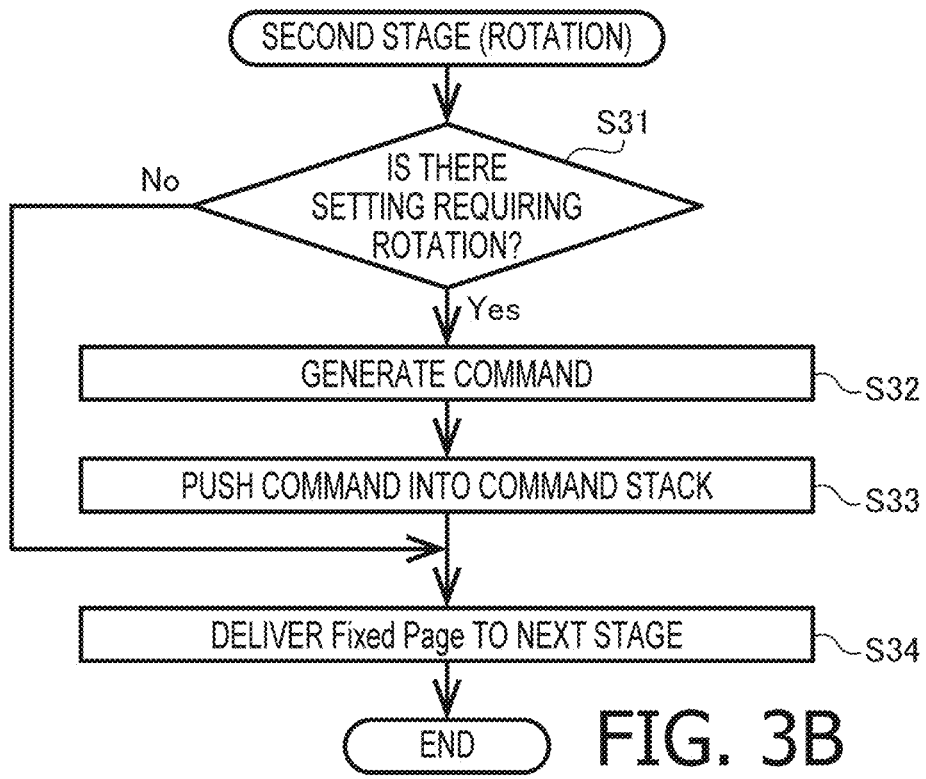

The second stage shown in FIG. 3B is a stage of rotating the ContentBox. In the second stage, the filter 41 determines whether a setting which requires rotation of the ContentBox is included in the print ticket (S31). When it is determined that the setting which requires rotation of the ContentBox is included in the print ticket (S31: YES), the filter 41 generates an command to rotate the ContentBox in accordance with the information included in the print ticket (S32) and pushes the generated command into the command stack which is associated with the Fixed Page (S33).

In the example shown in FIG. 9A, since an orientation of the second page is set as the portrait, when the filter 41 receives the Fixed Page of the second page from the stage manager (S31: YES), the filter 41 rotates the ContentBox by 90 degrees in accordance with the print setting. At this time, the filter 41 generates a command corresponding to the rotation of the ContentBox and pushes the generated command into the command stack which is associated with the Fixed Page.

Next, the filter 41 delivers the Fixed Page to the stage manager (S34). The stage manager delivers the received Fixed Page to the next stage in accordance with the pipeline.

On the other hand, when the filter 41 determines that a setting which requires rotation of the ContentBox is not included in the print ticket (S31: NO), in the example shown in FIG. 9A, for the first page, the process proceeds to S34.

Figure 3C:
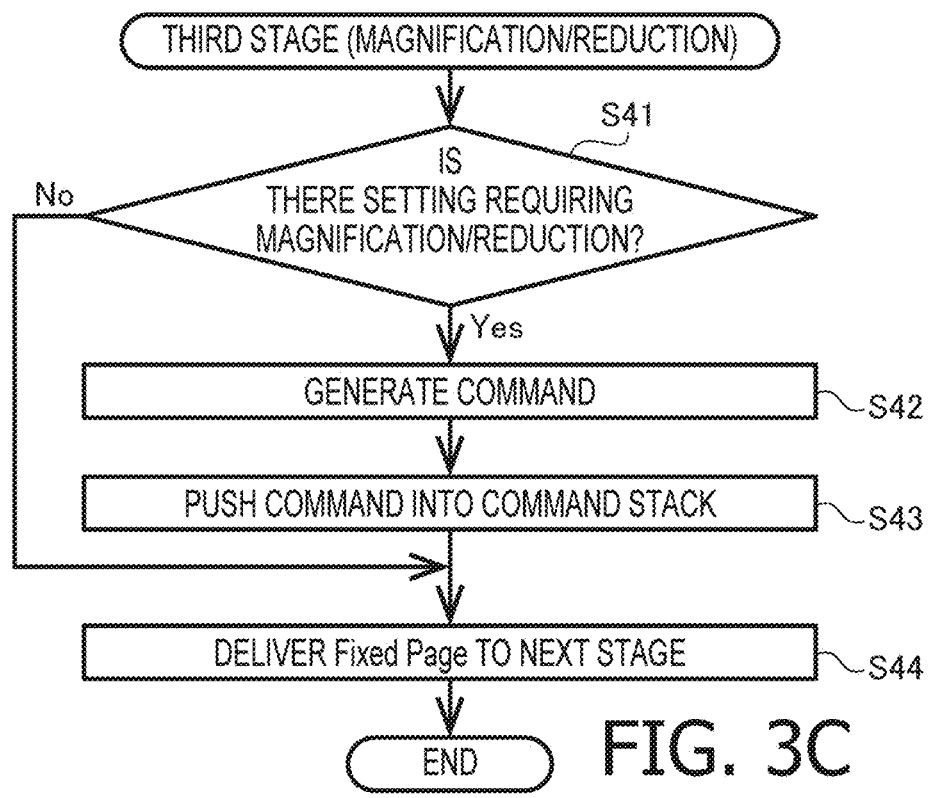

The third stage shown in FIG. 3C is a stage of magnifying/reducing the ContentBox. In the third stage, the filter 41 determines whether a setting requires magnification/reduction of the ContentBox is included in the print ticket (S41). When it is determined that the setting which requires magnification/reduction of the ContentBox is included in the print ticket (S41: YES), the filter 41 generates a command to magnify/reduce the ContentBox in accordance with the information included in the print ticket (S42), and pushes the generated command into the command stack which is associated with the Fixed Page (S43).

Next, the filter 41 delivers the Fixed Page to the stage manager (S44). The stage manager delivers the received Fixed Page to the next stage in accordance with the pipeline.

On the other hand, when it is determined that a setting which requires magnifying/reducing of the ContentBox is not included in the print ticket (S41: NO), that is, in the example of FIG. 9A, when the determination is made on both the first page and the second page, the process proceeds to S44.

Figure 4A:
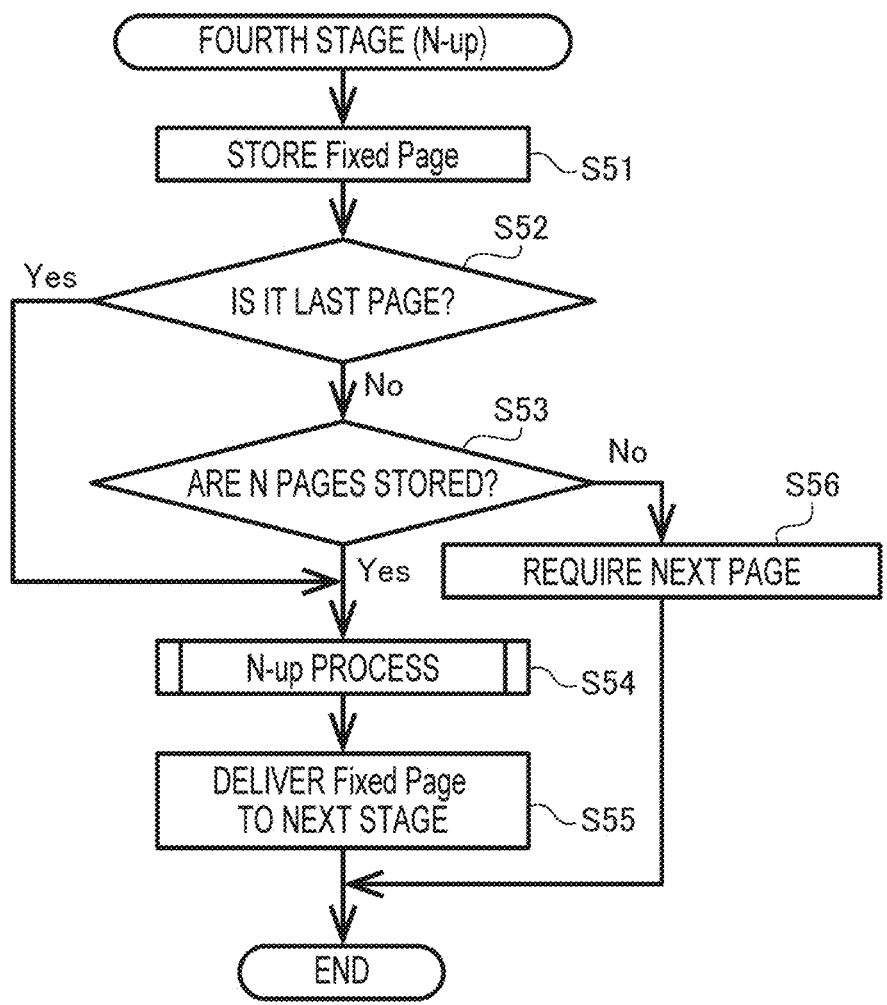
FIG. 4A is a flowchart showing a fourth stage of the pipeline.
Figure 5:
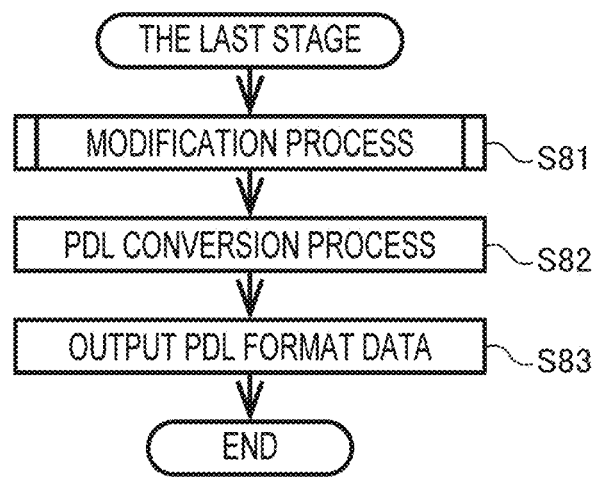
FIG. 5 is a flowchart showing a last stage of the pipeline.

The fourth stage shown in FIG. 4A is a stage corresponding to the print setting of the "N-up" which is of collecting the ContentBoxes of respective ones of the plurality of pages into one page. The stage manager stores the received Fixed Page into the memory 24 (S51). Then, the stage manager determines whether all the Fixed Pages of the print-target data have been stored, in S51, in the memory 24 (S52). When it is determined that all the Fixed Pages of the print-target data have not been stored in the memory 24 (S52: No), the stage manager determines whether Fixed Pages of N pages (i.e., first to N-th pages) have been stored in the memory 24 (S53). When the stage manager determines that the Fixed Pages of N pages have not been stored (S53: NO), the filter 41 delivers information requiring the next Fixed Page to the stage manager (S56). In this case, for example, NULL may be delivered to the stage manager.

On the other hand, when it is determined that the Fixed Pages for N pages have been stored in the memory 24 (S53: YES), or when it is determined that all the Fixed Pages of the print-target data have been stored in the memory 24 (S52: YES), the stage manager executes the N-up process (S54).

Figure 4B:
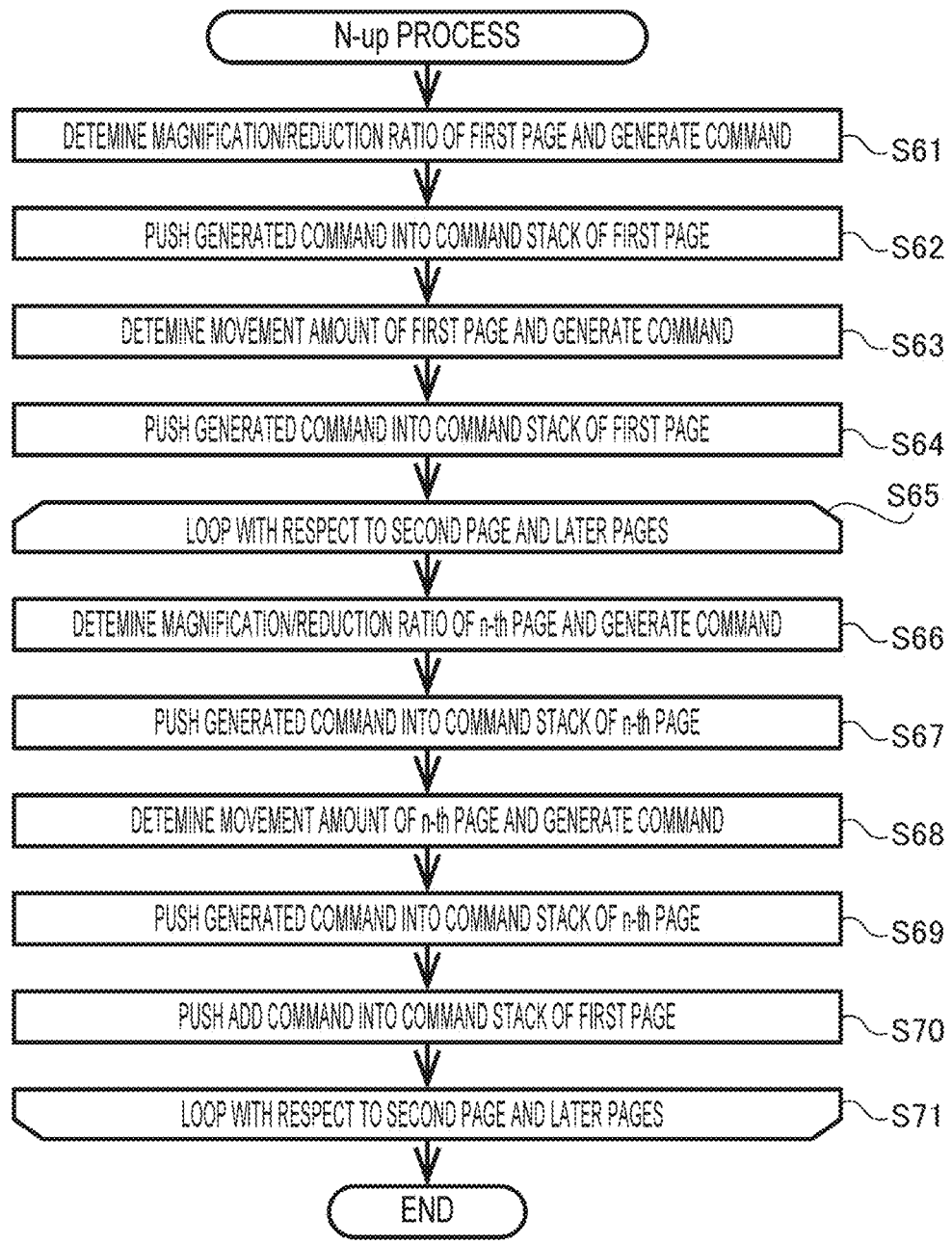
FIG. 4B is a flowchart showing an N-up process according to the illustrative embodiment.

Referring to FIG. 4B, the N-up process executed in S54 will explained. Firstly, the stage manager determines a magnification/reduction ratio of the ContentBox of the first page in accordance with the print setting, and generates a command indicating the affine transformation matrix of the determined magnification/reduction ratio (S61). Next, the stage manager pushes the generated command into the command stack of the first page (S62). Then, the command manager moves the ContentBox of the first page in accordance with the print setting, and generates a command (S63). The command generated in S63 indicates the affine transformation matrix for movement. The affine transformation matrix indicates movement corresponding to the moving amount of the ContentBox. Therefore, the visual element multiplied with the affine transformation matrix, which is indicated by the generated command, is moved by the same moving amount as that of the ContentBox. Then, the stage manager pushes the command generated in S63 into the command stack of the first page (S64).

Next, the stage manager determines a magnification/reduction ratio of the ContentBox of the second page in accordance with the print setting, and generates a command indicating the affine transformation matrix of the determined magnification/reduction ratio (S66). It is noted that the processes of S66-S70 described below are repeatedly executed with respect to the second page and later pages (S65, S71). That is, when, for example, the print setting is set to 4 in 1, the processes of S66-S70 are looped for each of pages 2-4.

Next, the stage manager pushes the command, which is generated in S66, into the command stack of the second page (S67). Next, the stage manager moves the ContentBox of the second page in accordance with the print setting, and generates a command (S68) indicating the affine transformation matrix for movement corresponding to the movement amount of the ContentBox of the second page. The stage manager pushes the command generated in S68 into the command stack of the second page (S69).

Then, the stage manager generates the add command for adding the reduced and moved ContentBox of the second page to the first page. The generated add command is a command indicating to add the reduced and moved visual element of the second page to the first page. The stage manager pushes the generated command into the command stack of the first page (S70).

The stage manager loops the processes of S66-S70 with respect to each page, and finishes the N-up process.

As shown in FIG. 4A, after executing the N-up process (S54), the stage manager delivers the Fixed Page to the next stage in accordance with the pipeline (S55). When the Fixed Page is received from the fourth stage (S55), the stage manager delivers the Fixed Page to the last stage in accordance with the pipeline. On the other hand, when the request of the Fixed Page is received from the fourth stage (S56), the stage manager delivers the Fixed Page to the first stage in accordance with the pipeline.

The last stage shown in FIG. 5 is executed after all the other stages are executed. The stage manager executes the modification process (S81) in the last stage. The modification process is a process to modify the visual element by using the commands, which are pushed into the command stack in the other stages before the last stage.

Referring to FIG. 6, the modification process will be described. The processes S92-S97 described below are looped for each page until no command is left (S91, S98). Further, the processes of S91-S99 are looped for all the pages (S90, S100).

The filter 41 pops a command from the command stack of an n-th page, and determines a type of the popped command (S92) (n being a natural number). When it is determined that the popped command is "m" indicating the affine transformation matrix of translation, rotation or magnification/reduction, the filter 41 multiplies the affine transformation matrix, which is indicated by the command, by an integrated affine transformation matrix A to newly generate an integrated affine transformation matrix (S93). An initial value of the integrated affine transformation matrix is a unit matrix E.

When determining that the popped command is "v" indicating addition of a visual element, the filter 41 generates a command v' (S94). Concretely, the filter 41 multiplies the integrated affine transformation matrix by the affine transformation matrix of the visual element indicated by the popped command, and defines that a command indicating the visual element which has the affine transformation matrix generated by the multiplication as a command v'. The filter 41 pushes the generated command into the visual element stack of the n-th page (S95).

When determining that the popped command is "p" indicating addition of a page, the filter 41 generates a command p' (S96). Concretely, the filter 41 continues to pop a command from the command stack of the page indicated by the popped command "p" until the command stack becomes empty, and executes the processes of S92-S97. Then, the filter 41 generates a command indicating addition of a page, which is obtained by execution of the processes of S92-S97, as the command p'. The filter 41 pushes the generated command p' into the visual element stack of the n-th page (S97).

When determining, for each page, that the command stack becomes empty, the filter 41 pops a command from the visual element stack and adds the visual element indicated by the popped command to the end of the Fixed Page (S99).

As shown in FIG. 5, after completion of the modification process (S81), the filter 41 converts the Fixed Page, which has been modified by the modification process, to print data having a PDL (Page Description Language) format (which will be referred to as the PDL format print data) (S82). The PDL format includes a PCL (Printer Control Language) format, a PCL/XL format, an ESC/P format, a PDF (Portable Document Format) or an XPS format. The process of S82 is an example of a first converting process.

The filter 41 outputs the print data (S83) generated by a PDL conversion process (S82) and finishes the process of the last stage.

Hereinafter, referring to FIG. 7 and FIGS. 10A-10J, change of the command stack by the processes of the pipeline and the modification process will be described in detail, taking the print setting shown in FIG. 9A for examples. FIG. 10A and FIG. 10B show the commands to be pushed into the command stack. FIG. 10C-FIG. 10J show a procedure of resolving the commands.

When the first stage receives the Fixed Page of the first page in the first stage, the filter 41 pushes a command v1 to add a watermark to the first page into the command stack of the first page as shown in FIG. 10A.

Next, when the second stage receives the Fixed Page of the first page, the filter 41 determines that rotation of the first page is not executed. That is, a command will not be generated in the second stage of the first page.

Next, when the third page receives the Fixed Page of the first page, the filter 41 determines that magnification/reduction of the first page will not be executed. That is, a command will not be generated in the third stage of the first page.

Next, when the fourth stage receives the Fixed Page of the first page, as shown in FIG. 10A, the filter 41 generates commands m3 and m4, and pushes the generated commands into the command stack of the first page. The command m3 is a command indicating an affine transformation matrix of reduction. The affine transformation matrix is a matrix to reduce the size of the ContentBox of the first page shown in FIG. 9B to the size of the ContentBox shown in FIG. 9D. The command m4 is a command indicating an affine transformation matrix of translation. The affine transformation matrix is a matrix to change a location of the ContentBox of the first page shown in FIG. 9B to a location of the ContentBox shown in FIG. 9D.

Then, as shown in FIG. 10A, the filter 41 generates a command p2 to add a visual element of the second page to the first page, and pushes the generated command p2 into the command stack of the first page.

As the first stage through the fourth stage are executed on the first page, the command v1, the command m3, the command m4 and the command p2 are pushed into the command stack of the first page in order as shown in FIG. 10B.

When the first stage receives the Fixed Page of the second page, the filter 41 determines that the watermark is not added to the second page. That is, in the first stage of the second page, no command is generated.

Next, when the second stage receives the Fixed Page of the second page, the filter 41 generates the command m1 and the command m2, and pushes the commands m1 and m2 into the command stack of the second page. The command m1 represents a matrix to rotate the ContentBox of the second page shown in FIG. 9C to have the orientation shown in FIG. 9D. That is, the command m1 is a command indicating an affine transformation matrix of 90-degree rotation.

Figure 8A:
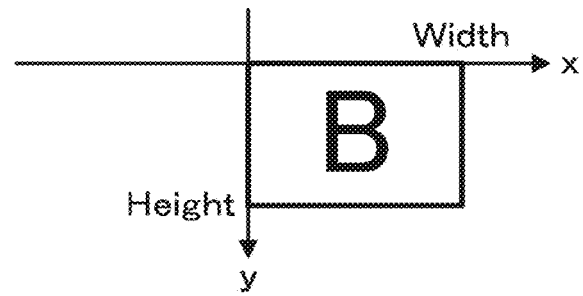
FIGS. 8A, 8B, 8C and 8D illustrate rotation of a content box.
Figure 8B:
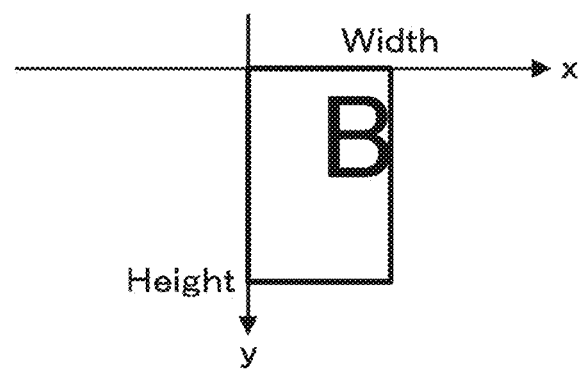
Figure 8C:
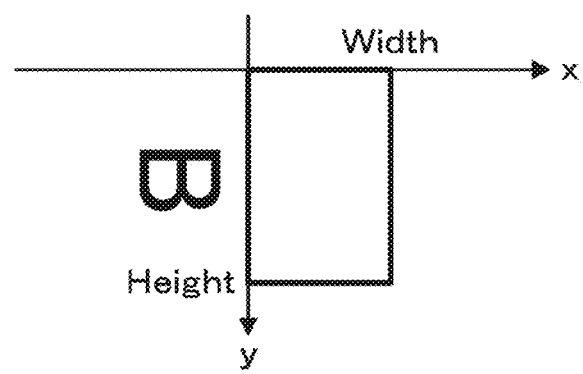
Figure 8D:
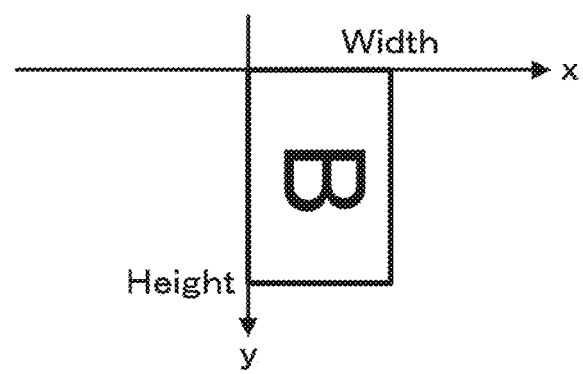

The command m2 is a command indicating an affine transformation matrix of translation, which will be described in detail referring to FIG. 8A-FIG. 8D. FIG. 8A shows an initial state of an image. FIG. 8B shows a state where the ContentBox is rotated by 90 degrees by exchanging Width (200) and Height (272) of the ContentBox with each other. FIG. 8C shows a state where the visual element "B" has been rotated by 90 degrees. As shown in FIG. 8C, by rotating the visual element "B" by 90 degrees, relative positions between the visual element "B" and ContentBox are misaligned. The command m2 represents an affine transformation matrix to translate the visual element "B", in the X-axis direction, to an appropriate position where the ContentBox and the visual element "B" are appropriately aligned. An amount of the translation is the Page Width (210) included in the print-target data.

When the third stage receives the Fixed Page of the second page, the filter 41 determines that the second page will not be magnified/reduced. That is, no command is generated in the third stage of the second page.

When the fourth stage receives the Fixed Page of the second page, as shown in FIG. 10A, the filter 41 generates commands m5 and m6, and pushes the generated commands m5 and m6 into the command stack of the first page. The command m5 a command representing an affine transformation matrix of reduction, which is a matrix to reduce a size of the ContentBox of the second page shown in FIG. 9B to a size shown in FIG. 9D. The command m6 is a command representing an affine transformation matrix of translation, which is a matrix to translate the ContentBox of the second page in FIG. 9B to a position shown in FIG. 9D.

As the first stage through the fourth stage are executed on the second page, as shown in FIG. 10B, the command m1, the command m2, the command m5 and the command m6 are pushed into the command stack of the second page in this order.

Figure 7A:
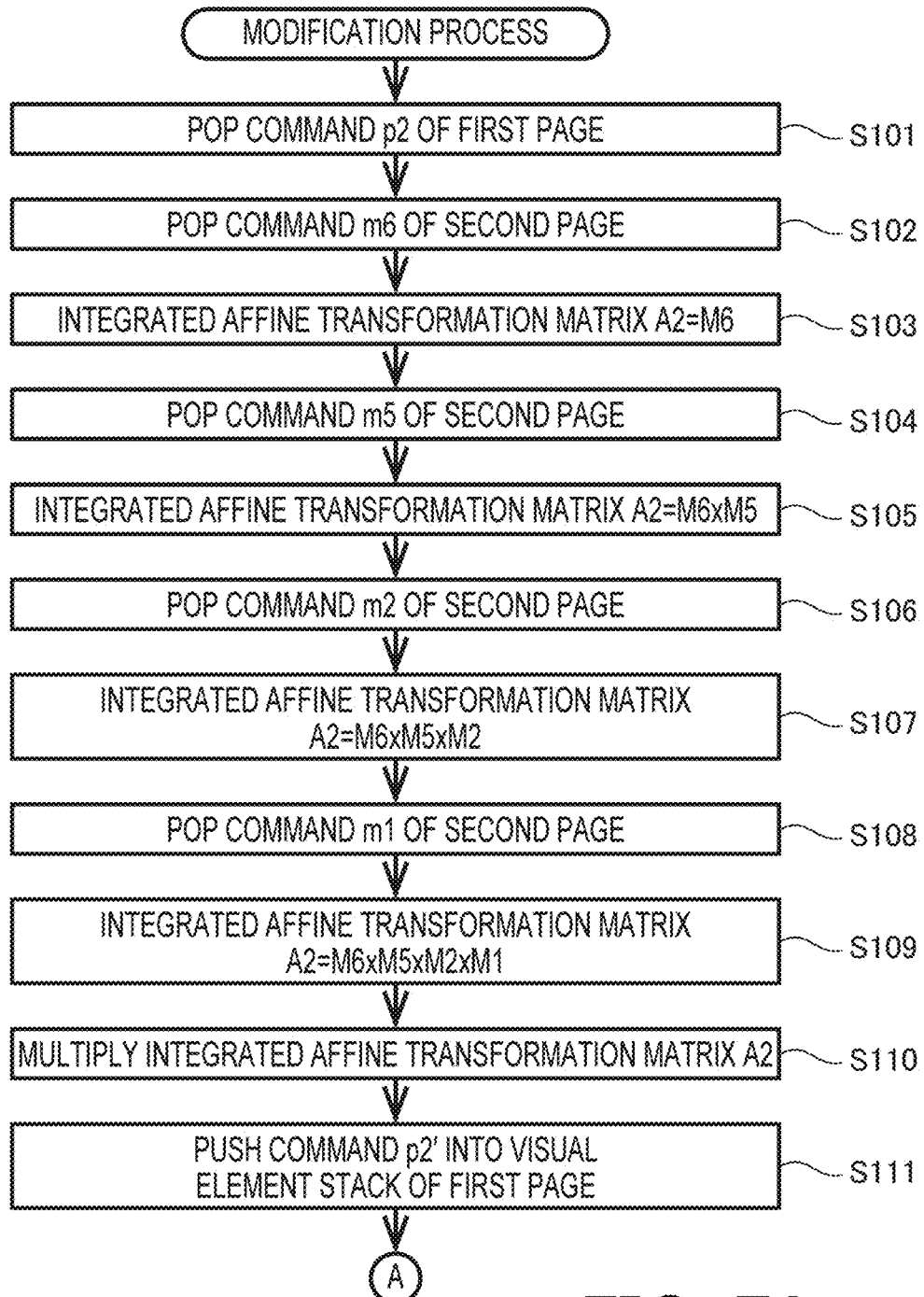
FIGS. 7A and 7B show a flowchart showing the transformation process, specifically.
Figure 7B:
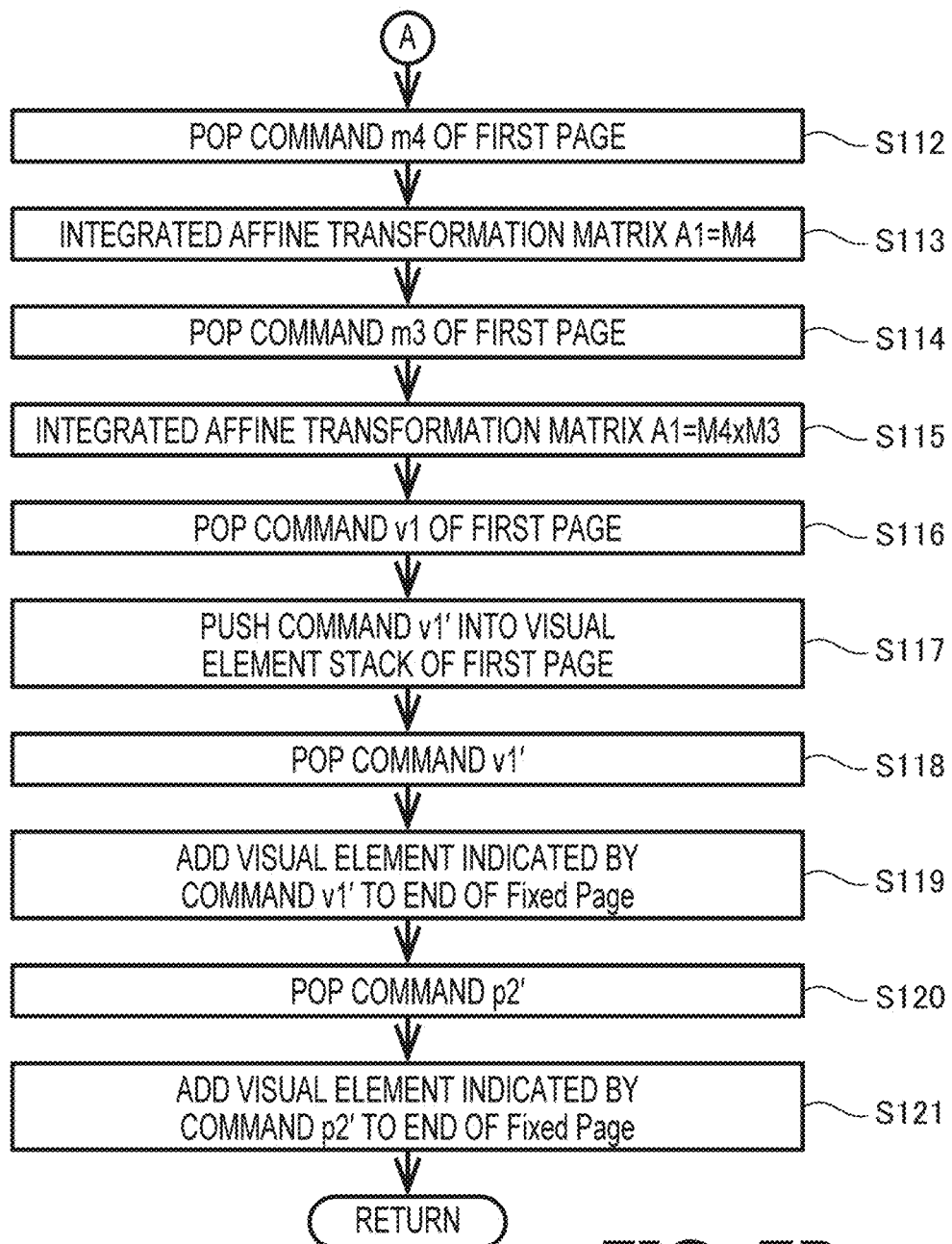

Next, resolution of the commands in the modification process will be described, referring to FIG. 7 and FIG. 10. As shown in FIG. 10C, the filter 41 pops the command p2 from the command stack of the first page (S101). In resolving the command p2, the filter 41 pops the commands m6, m5, m2 and m1 from the command stack of the second page in this order, as shown in FIG. 10C and FIG. 10D, to resolves the same.

The filter 41 pops the command m6 (S102) and regards the affine transformation matrix M6 indicated by the popped command m6 as the integrated affine transformation matrix A2 (S103). Concretely, the filter 41 multiplies the integrated affine transformation matrix A2, which is a unit matrix E (an initial value), by the affine transformation matrix M6 to define a new integrated affine transformation matrix A2 (=M6). Then, the filter 41 pops the command m5 (S104), and multiplies the integrated affine transformation matrix A2 by an affine transformation matrix M5 which is indicated by the popped command m5, to define a new integrated affine transformation matrix A2 (=M6×M5) (S105). Next, the filter 41 pops the command m2 (S106), and multiplies the integrated affine transformation matrix A2 by an affine transformation matrix M2, which is indicated by the popped command m2, to define a new integrated affine transformation matrix A2 (=M6×M5×M2) (S107). Then, the filter 41 pops the command m1 (S108), and multiplies the integrated affine transformation matrix A2 by an affine transformation matrix M1, which is indicated by the popped command m1, to define a new integrated affine transformation matrix A2 (=M6×M5×M2×M1) (S109).

In response to the command stack of the second page becoming empty, as shown in FIG. 10D, the filter 41 multiplies the integrated affine transformation matrix A2 by each of the affine transformation matrices of respective visual elements of the second page (S110). The filter 41, as shown in FIG. 10E, pushes the command p2' indicating each visual element obtained by the multiplication into the visual element stack of the first page (S111).

After resolving the command p2, as shown in FIG. 10F and FIG. 10G, the filter 41 pops and resolves the command m4, and subsequently, pops and resolves the command m3. Specifically, the filter 41 pops the command m4 (S112), and regards the affine transformation matrix M4 indicated by the popped command m4 as the integrated affine transformation matrix A1 for the first page (S113). Concretely, the filter 41 multiplies the integrated affine transformation matrix A1, which is the unit matrix E (an initial value), by the affine transformation matrix M4 to define a new integrated affine transformation matrix A1 (=M4). Then, the filter 41 pops the command m3 (S114), and multiplies the integrated affine transformation matrix A1 by the affine transformation matrix M3 is indicated by the popped command m3 to define the new integrated affine transformation matrix A2 (=M4×M3) (S115).

Next, as shown in FIG. 10H, the filter 41 pops the command v1 from the command stack of the first page (S116), and resolves the popped command v1. Specifically, as shown in FIG. 10I and FIG. 10J, the filter 41 multiplies the integrated affine transformation matrix A1 of the first page by the affine transformation matrix included in the visual element which is indicated by the command v1. Then, the filter 41 pushes the command v1' indicating the matrix which is obtained by the multiplication into the visual element stack of the first page (S117).

In response to the command stack of the first page becoming empty, the filter 41 pops the command v1' from the visual element stack of the first page, and adds the visual element indicated by the command v1' to the end of the Fixed Page of the first page (S119).

Next, the filter 41 pops the command p2' from the visual element stack of the first page (S120), and adds the visual element indicated by the command p2' to the end of the Fixed Page of the first page (S121).

The affine transformation matrices M1, M2, M3, M4, M5 and M6 are examples of a transformation matrix. The integrated affine transformation matrices A1 and A2 are examples of an integrated transformation matrix. The commands respectively indicating the affine transformation matrices M1, M2, M3, M4, M5 and M6 are examples of a first command.

Effects of the Embodiment

In the illustrative embodiment described above, since the integrated affine transformation matrix is generated by multiplying a plurality of the affine transformation matrices, the number of calculating operations by the CPU 23 of the PC 10 can be reduced in comparison with a case where the visual element is modified by the plurality of affine transformation matrices individually. As a result, a generation time of the print data can be shortened.

Further, according to illustrative embodiment, since the processes from receipt of the print-target data to output of the PDL format print data are executed only in the filter 41, the generation time of the print data can be shortened in comparison with a conventional printer driver consisting of a plurality of filters. That is, in the conventional printer driver consisting of the plurality of filters (DLLs), when data is delivered from one of the filters to another, the data is required to be converted to XPS format data or binary data. Therefore, in each filter, when the data is input or output, a data format should be converted. Further, when input and output of the data in each of the filters are a stream input and a stream output, it becomes further necessary to convert (i.e., serialize and deserialize) the data in each filter. In contrast, according to the illustrative embodiment, since the processes from receipt of the print-target data to output of the PDL format print data are executed only by the filter 41, the number of calculating operations by the CPU 23 is reduced in comparison with the conventional printer driver consisting of a plurality of filters, as the data transformations are not required in the plurality of filters. Thus, generation time of the print data can be shortened.

According to the illustrative embodiment, since the processes from the receipt of the print object data to the output of the PDL format print data are executed only by the filter 41, even if the filter 41 receives the print-target data as the stream input (S13), by only a single deserializing process, the print data can be output.

Further, according to the illustrative embodiment, before modifying the visual element, the affine transformation matrix and the command are generated by modifying the content box, which has as a smaller amount of data than the visual element, the command and the affine transformation matrix necessary for modifying the visual element can be generated by relatively small number of calculating operations by the CPU 23. As a result, a data generation time of the print data can be shortened.

Further, according to the illustrative embodiment, since the generated commands are pushed into the command stack, the commands can be stored with the order the commands being specified. As a result, in the modification process, the commands can be popped from the command stack, and the integrated affine transformation matrix can be generated by integrating the affine transformation matrices respectively indicated by the commands.

Further, according to the illustrative embodiment, since a modification to add a watermark is executed simultaneously with a modification of the visual element, the number of calculating operations by the CPU 23 can be reduced in comparison with a case where the modification to add the watermark is executed separately from the modification of the visual element. Thus, according to the illustrative embodiment, it is possible to more shorten the generation time of the print data.

<Modifications>

Figure 11A:
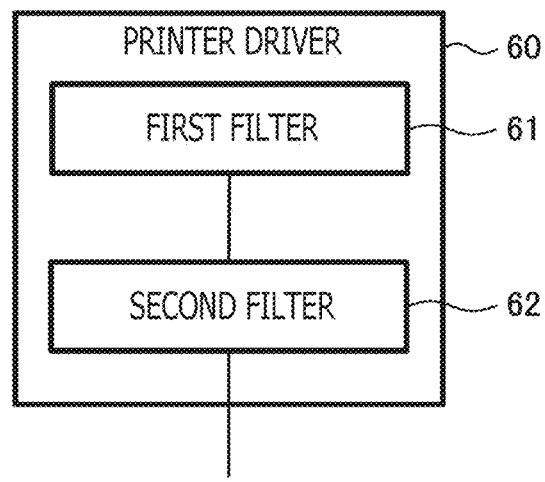
FIG. 11A shows a configuration of a printer driver according to a modified embodiment.

In the illustrative embodiment, the printer driver 32 provided with only the filter 41 is described. In a modification, a printer driver 60 having a first filter 61 and a second filter 62 (see FIG. 11A) will be described. Hereinafter, the same reference numbers are assigned to structures/components/members which are the same as those of the illustrative embodiment, and explanation of thereof will be omitted.

The printer driver 60 is provided with the first filter 61 and the second filter 62. The second filter 62 is a so-called PDL converter. A known PDL converter may be used as the second filter 62.

Figure 11B:
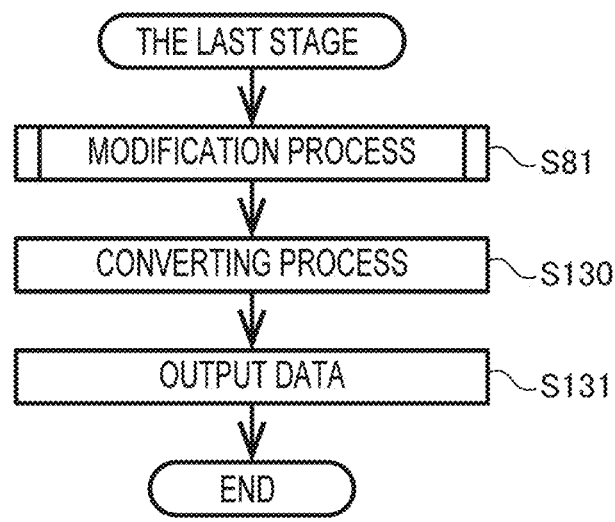
FIG. 11B is a flowchart showing the last stage of the pipeline according to the modified embodiment.

According to the modification, the second filter 62 is configured to execute the process of the last stage shown in FIG. 11B in place of the process of the last stage shown in FIG. 5. After executing the modification process (S81), the first filter 61 executes a converting process of converting the Fixed Page to data having a format that is receivable by the second filter 62 (S130). The format receivable by the second filter 62 may be the XPS format or the binary format. The converting process in S130 is an example of a second converting process. Thereafter, the first filter 61 delivers the converting Fixed Page (S131) to the second filter 62. It is noted that an output from the first filter 61 may be the stream output or the XPS output.

The second filter 62, which receives the Fixed Page modified by the first filter 61, executes the PDL conversion process (S82), and outputs print data having the PDL format (S83).

According to the modification, since the known PDL converter can be used, programming of the first filter 61 becomes easy.

Other Modifications

In the illustrative embodiment above, an example in which a particular pipeline is constructed is described. The above-described configuration may be modified such that the stage manager of the filter 41 may configure a pipeline based on the print ticket (the print setting). For example, when it is set in the print ticket that the command is to be generated by a stage, the stage manager may add such a stage to the pipeline. In an example of the print ticket shown in FIG. 9A, the stage manager adds the first stage and the second stage shown in FIG. 3B and the fourth stage shown in FIG. 4 to the pipeline. Further, the stage manager configures the pipeline such that the last stage is certainly executed lastly.

According to the above modification, since the pipeline is appropriately configured based on the print setting, unnecessary processes can be omitted. As a result, the generation time of the print data can further be shortened.

What is claimed is:

1. A non-transitory computer-readable medium storing computer-readable instructions that is executable by a controller of an information processing device, the instructions causing, when executed, the controller to perform:
   a receiving process of receiving print-target data including first object data indicating a graphical object and modification instruction data instructing to perform a plurality of modifications of the graphical object;
   a generating process of generating a plurality of first commands corresponding to the plurality of modifications, respectively, the first object data including a matrix indicating at least one of a position and a size of the graphical object, the plurality of first commands indicating transformation matrices, respectively, each of the transformation matrices transforming the matrix of the first object data based on one of the plurality of modifications, wherein the generating process comprises a process of pushing the plurality of first commands into a command stack;
   an integrating process of generating an integrated transformation matrix by multiplying the transformation matrices; and
   a modifying process of modifying the first object data by multiplying the matrix of the first object data by the integrated transformation matrix, wherein the modifying process comprises:
     a process of popping the plurality of first commands from the command stack; and
     a process of generating the integrated transformation matrix by multiplying the transformation matrices indicated by the popped plurality of first commands.

2. The non-transitory computer-readable medium according to claim 1, wherein the instructions include a first filter which causes the controller to perform the receiving process, the generating process, the integrating process and the modifying process.

3. The non-transitory computer-readable medium according to claim 2, wherein the first filter causes the controller to perform a first converting process to convert the print-target data including the modified first object data to print data having a specific format.

4. The non-transitory computer-readable medium according to claim 2,
   wherein the instructions includes a second filter which causes the controller to perform a converting process to convert data, which is input to the second filter, to print data having a specific format, and
   wherein the first filter causes the controller to perform a second converting process to convert the print-target data including the modified first object data to print data having a format receivable by the second filter.

5. The non-transitory computer-readable medium according to claim 1,
   wherein the print-target data includes content box data indicating an area on which the graphical object is rendered, and
   wherein the generating process includes:
     a process of modifying the content box data based on the modification instruction data; and
     a process of generating the plurality of first commands in accordance with the modification of the content box data.

6. The non-transitory computer-readable medium according to claim 5,
   wherein the generating process includes:
     a stage to rotate a content box indicated by the content box data and generate the integrated transformation matrix in accordance with a rotation angle of the content box;
     a stage to magnify/reduce the content box indicated by the content box data and generate the integrated transformation matrix in accordance with magnification/reduction ratio of the content box; and a stage to collect a plurality of pages indicated by the print-target data in one page and generate the integrated transformation matrix in accordance with the collection of the plurality of pages, and wherein the print-target data is provided from one of the stages to another one of the stages.

7. The non-transitory computer-readable medium according to claim 1, wherein the generating process further includes:

a process of generating a second command corresponding to the modification instruction data instructing to add second object data; and a process of pushing the generated second command into the command stack.

8. The non-transitory computer-readable medium according to claim 1, wherein the receiving process receives the print-target data as a stream input.

9. The non-transitory computer-readable medium according to claim 1, wherein the print-target data has an XPS format.

10. The non-transitory computer-readable medium according to claim 1, wherein the receiving process receives the print-target data and the modification instruction data from an operating system installed to the information processing device.

11. A system comprising an information processing device and an image forming device, the information processing device comprising a controller configured to:

receive print-target data including first object data indicating a graphical object and modification instruction data instructing to perform a plurality of modifications of the graphical object;

generate a plurality of first commands corresponding to the plurality of modifications, respectively, the first object data including a matrix indicating at least one of a position and a size of the graphical object, the plurality of first commands indicating transformation matrices, respectively, each of the transformation matrices transforming the matrix of the first object data based on one of the plurality of modifications, wherein generate comprises pushing the plurality of first commands into a command stack;

generate an integrated transformation matrix by multiplying the transformation matrices;

modify the first object data by multiplying the matrix of the first object data by the integrated transformation matrix, wherein the modifying comprises:

popping the plurality of first commands from the command stack; and generating the integrated transformation matrix by multiplying the transformation matrices indicated by the popped plurality of first commands; and generate print data based on the print-target data including the first object data, and wherein the image forming device is configured to form an image on a recording medium based on the print data generated by the controller of the information processing device.

12. A method of controlling a system including an information processing device and an image forming device configured to form an image on a recording medium, the method comprising:

receiving print-target data including first object data indicating a graphical object and modification instruction data instructing to perform a plurality of modifications of the graphical object;

generating a plurality of first commands corresponding to the plurality of modifications, respectively, the first object data including a matrix indicating at least one of a position and a size of the graphical object, the plurality of first commands indicating transformation matrices, respectively, each of the transformation matrices transforming the matrix of the first object data based on one of the plurality of modifications, wherein generating comprises a process of pushing the plurality of first commands into a command stack;

generating an integrated transformation matrix by multiplying the transformation matrices;

modifying the first object data by multiplying the matrix of the first object data by the integrated transformation matrix, wherein the modifying comprises:

popping the plurality of first commands from the command stack; and generating the integrated transformation matrix by multiplying the transformation matrices indicated by the popped plurality of first commands;

generate print data based on the print-target data including the first object data; and forming an image on the recording medium based on the generated print data by using the image forming device.

* * * * *